United States Patent
Yan

(10) Patent No.: US 11,393,184 B2
(45) Date of Patent: Jul. 19, 2022

(54) SYSTEMS AND METHODS FOR ADAPTIVE BOUNDING BOX SELECTION

(71) Applicants: Denso International America, Inc., Southfield, MI (US); Denso Corporation, Aichi (JP)

(72) Inventor: Yu Yan, Pittsburgh, PA (US)

(73) Assignee: Denso International America, Inc., Southfield, MI (US)

(*) Notice: Subject to any disclaimer, the term of this patent is extended or adjusted under 35 U.S.C. 154(b) by 0 days.

(21) Appl. No.: 17/097,643

(22) Filed: Nov. 13, 2020

(65) Prior Publication Data
US 2022/0156505 A1  May 19, 2022

(51) Int. Cl.
G06V 20/56 (2022.01)
G06V 20/64 (2022.01)
G06V 10/22 (2022.01)
G06V 10/98 (2022.01)

(52) U.S. Cl.
CPC ............ *G06V 10/22* (2022.01); *G06V 10/98* (2022.01); *G06V 20/56* (2022.01); *G06V 20/64* (2022.01)

(58) Field of Classification Search
None
See application file for complete search history.

(56) References Cited

U.S. PATENT DOCUMENTS

| | | |
|---|---|---|
| 9,703,291 B1 | 7/2017 | Zhu et al. |
| 10,705,884 B2 | 7/2020 | Altintas et al. |
| 10,745,006 B2 | 8/2020 | Grimm et al. |
| 10,755,112 B2 | 8/2020 | Mabuchi |
| 10,759,444 B2 | 9/2020 | Michalakis et al. |
| 2019/0103026 A1 | 4/2019 | Liu et al. |
| 2019/0268402 A1 | 8/2019 | Kallakuri et al. |
| 2019/0317519 A1 | 10/2019 | Chen |
| 2020/0219316 A1 | 7/2020 | Baik et al. |
| 2020/0393845 A1* | 12/2020 | Wang ............... G06K 9/00791 |
| 2021/0146952 A1* | 5/2021 | Vora ................ G06K 9/00201 |
| 2021/0150230 A1* | 5/2021 | Smolyanskiy ....... G06K 9/6256 |

FOREIGN PATENT DOCUMENTS

EP  3703008 A1  9/2020

* cited by examiner

*Primary Examiner* — Idowu O Osifade
(74) *Attorney, Agent, or Firm* — Christopher G. Darrow; Darrow Mustafa PC

(57) ABSTRACT

Systems, methods, and other embodiments described herein relate to representing identified objects in a surrounding environment of a vehicle. In one embodiment, a method includes, in response to acquiring information including sensor data and operating data in a vehicle, setting a parameter for analyzing the sensor data according to the information to select between 3D bounding boxes and 2D bounding boxes for representing identified objects in a surrounding environment of the vehicle. The method includes analyzing the sensor data according to the parameter. The method includes providing an electronic output in the vehicle according to the parameter.

20 Claims, 7 Drawing Sheets

SYSTEMS AND METHODS FOR ADAPTIVE BOUNDING BOX SELECTION

TECHNICAL FIELD

The subject matter described herein relates in general to systems and methods for representing identified objects in a surrounding environment of a vehicle, and, more particularly, to selectively adapting a type of bounding box for representing the identified objects.

BACKGROUND

Perceiving an environment can be an important aspect for many different computational functions, such as automated vehicle assistance systems. However, accurately perceiving the environment can be a complex task that balances computational costs, speed of computations, and an extent of accuracy. For example, as a vehicle moves more quickly, the time in which perceptions are to be computed is reduced since the vehicle may encounter objects more quickly. Additionally, in complex situations, such as intersections with many dynamic objects, the accuracy of the perceptions may be preferred. In any case, processing systems are generally configured to use a single type of representation for identified objects. Based on the characteristics of the representation, the representation may be best suited for different circumstances. However, neither approach alone is generally well suited for computational efficiency and accurate determinations.

SUMMARY

In one embodiment, example systems and methods associated with representing identified objects in a surrounding environment of a vehicle are disclosed. As previously noted, accurately representing an object, and doing so with computational efficiency can be a difficult task. As such, a system may be unable to adequately perceive some circumstances depending on the way in which the system represents objects. Thus, in one embodiment, a disclosed approach resolves difficulties with using a single type of representation for objects. For example, as a vehicle travels along a road, a disclosed system gathers information that informs the system about whether accuracy or computational efficiency is preferred. That is, as previously noted, in certain circumstances, such as at complex intersections, accurately representing an object may be preferred over quickly deriving information. As such, in at least one embodiment, the disclosed system improves processing of sensor data and how objects are represented by analyzing the information to determine which is preferred and selecting a type of representation accordingly.

In various approaches, the disclosed system may analyze different information to derive a selection of processing routines. For example, the disclosed system may analyze sensor data about a surrounding environment of the vehicle to identify a current context (e.g., at an intersection, driving slowly, driving at high speeds, the presence of other vehicles/objects, etc.). In a further aspect, the disclosed system may analyze operating data to determine a current processing load of the vehicle and/or whether one or more aspects of the vehicle are not presently functioning (e.g., sensor is experiencing an error, thereby limiting perceptions). Using the information, the disclosed system can then select which processing approach to implement.

In one example, the disclosed system selects between using two-dimensional bounding boxes and three-dimensional bounding boxes. Two-dimensional bounding boxes are generally more computationally efficient for representing objects, but do not accurately represent objects well in three-dimensional space. By contrast, three-dimensional bounding boxes represent objects accurately but are more computationally intensive than two-dimensional bounding boxes. Accordingly, based on the information, the disclosed approach sets a parameter that controls, for example, an image processing unit to use one of the bounding box types for processing. The image processing unit then proceeds to use the selected type until the system determines that a preference has changed according to subsequently acquired information. Thus, the system processes the sensor data using the selected type and provides information to various systems of the vehicle so that the vehicle can, for example, perform automated functions, such as autonomous driving, advanced driver assistance, and so on. In this way, the disclosed approach improves the ability of the vehicle to adapt to varying conditions by balancing accuracy with computational efficiency.

In one or more arrangements, a monitoring system is disclosed. The monitoring system includes one or more processors and a memory that is communicably coupled to the one or more processors. The memory stores a detection module including instructions that, when executed by the one or more processors, cause the one or more processors to, in response to acquiring information including sensor data and operating data in a vehicle, set a parameter for analyzing the sensor data according to the information to select between 3D bounding boxes and 2D bounding boxes for representing identified objects in a surrounding environment of the vehicle. The memory stores a capture module including instructions that, when executed by the one or more processors, cause the one or more processors to i) analyze the sensor data according to the parameter, and ii) provide an electronic output in the vehicle according to the parameter.

In one or more arrangements, a non-transitory computer-readable medium is disclosed. The instructions include instructions to, in response to acquiring information including sensor data and operating data in a vehicle, set a parameter for analyzing the sensor data according to the information to select between 3D bounding boxes and 2D bounding boxes for representing identified objects in a surrounding environment of the vehicle. The instructions include instructions to analyze the sensor data according to the parameter. The instructions include instructions to provide an electronic output in the vehicle according to the parameter.

In one or more arrangements, a method is disclosed. The method may include, in response to acquiring information including sensor data and operating data in a vehicle, setting a parameter for analyzing the sensor data according to the information to select between 3D bounding boxes and 2D bounding boxes for representing identified objects in a surrounding environment of the vehicle. The method includes analyzing the sensor data according to the parameter. The method includes providing an electronic output in the vehicle according to the parameter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
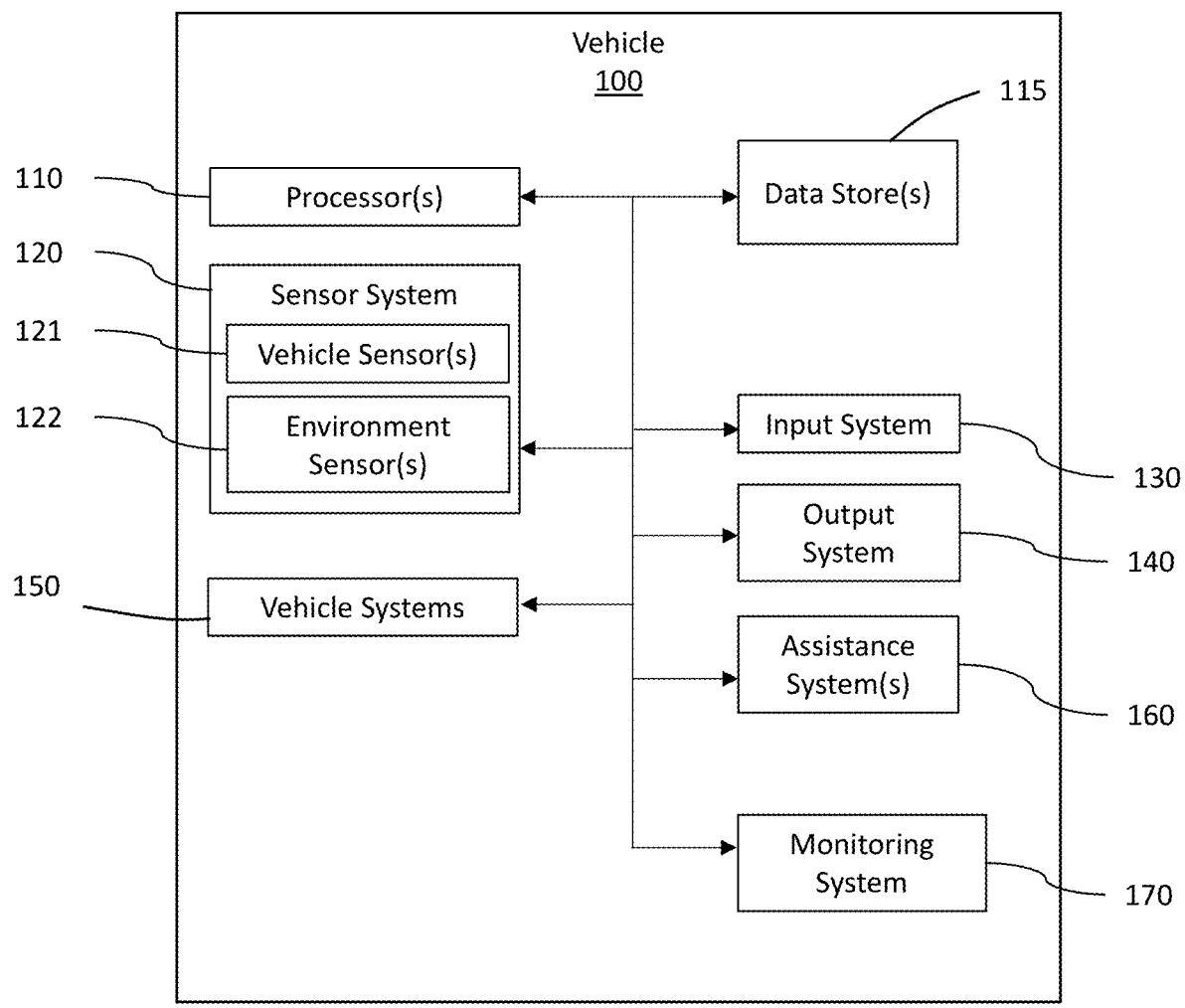
FIG. 1 illustrates one embodiment of a vehicle in which example systems and methods disclosed herein may operate.

Systems, methods, and other embodiments associated with representing identified objects in a surrounding environment of a vehicle are disclosed. As previously noted, electronically representing an object within a machine perception context can involve tradeoffs between computational efficiency and accuracy. As such, many systems may be unable to adequately perceive some circumstances depending on the way in which the systems represent objects. Thus, in one embodiment, a disclosed approach resolves difficulties with using a single type of representation for objects. For example, as a vehicle travels along a road, a monitoring system gathers information that informs the monitoring system about whether accuracy or computational efficiency is preferred. That is, as previously noted, in different circumstances, different processing approaches may be desirable, such as complex intersections versus simple highway driving, where accurately representing an object may be preferred over quickly deriving information. Therefore, in at least one embodiment, the monitoring system improves the processing of sensor data and how objects are represented by analyzing the information to determine which is preferred and selecting a type of representation accordingly.

In various approaches, the disclosed system may analyze different information to derive a selection of processing routines. For example, the disclosed system may analyze sensor data about a surrounding environment of the vehicle to identify a current context (e.g., at an intersection, driving slowly, driving at high speeds, the presence of other vehicles/objects, etc.). In a further aspect, the disclosed system may analyze operating data (e.g., processor temperature, error states, etc.) to determine a current processing load of the vehicle and/or whether one or more aspects of the vehicle are not presently functioning (e.g., a sensor is experiencing an error thereby limiting perceptions). Using the information, the monitoring system can then select which processing approach to implement.

In one example, the monitoring system selects between using two-dimensional bounding boxes and three-dimensional bounding boxes. Two-dimensional bounding boxes are generally more computationally efficient for representing objects but do not accurately represent objects well in three-dimensional space. By contrast, three-dimensional bounding boxes represent objects accurately but are more computationally intensive than two-dimensional bounding boxes. Accordingly, based on the information, the monitoring system sets a parameter that controls, for example, an image processing unit to use one of the bounding box types for processing. The image processing unit then proceeds to use the selected type until the system determines that a preference has changed according to subsequently acquired information. Thus, the system processes the sensor data using the selected type and provides information to various systems of the vehicle so that the vehicle can, for example, perform automated functions, such as autonomous driving, advanced driver assistance, and so on. In this way, the disclosed approach improves the ability of the vehicle to adapt to varying conditions by balancing accuracy with computational efficiency.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that benefits from the functionality discussed herein. It should be appreciated that the vehicle 100 may also be referred to as the subject vehicle 100 herein in order to further identify the vehicle 100 as the entity that includes the monitoring system 170.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a monitoring system 170 that functions to improve the processing of identified objects through selectively adapting representation of the identified objects. Moreover, while depicted as a standalone component, in one or more embodiments, the monitoring system 170 is integrated with the assistance system 160, a camera, or another similar system of the vehicle 100 as a sub-component thereof. The noted functions and methods will become more apparent with a further discussion of the figures.

Figure 2:
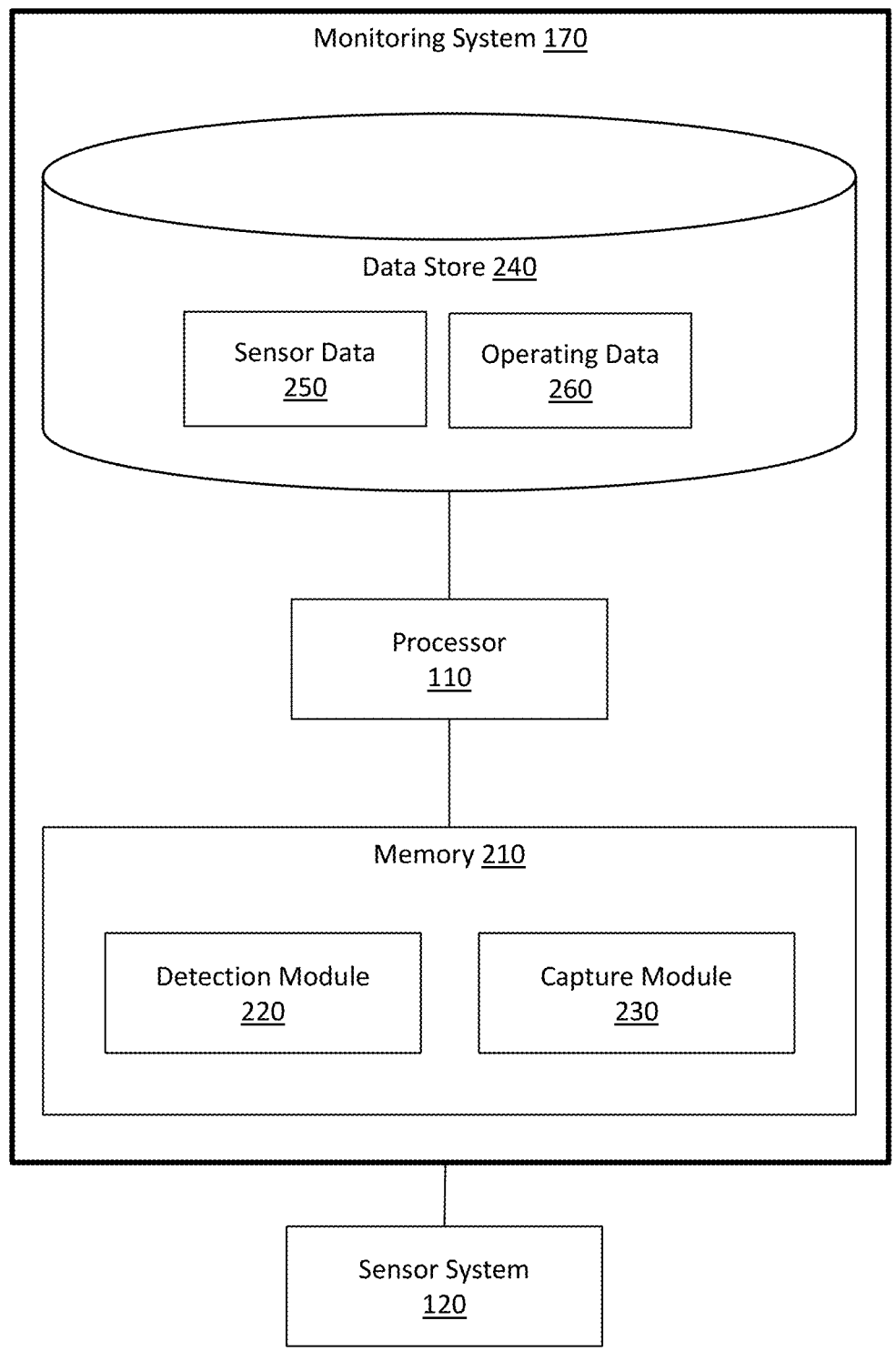
FIG. 2 illustrates one embodiment of a monitoring system that is associated with selectively adapting the representation of identified objects in a surrounding environment of a vehicle.

With reference to FIG. 2, one embodiment of the monitoring system 170 is further illustrated. As shown, the monitoring system 170 includes a processor 110. Accordingly, the processor 110 may be a part of the monitoring system 170, or the monitoring system 170 may access the processor 110 through a data bus or another communication pathway. In one or more embodiments, the processor 110 is an application-specific integrated circuit that is configured to implement functions associated with a detection module 220 and a capture module 230. More generally, in one or more aspects, the processor 110 is an electronic processor such as a microprocessor that is capable of performing various functions as described herein when executing encoded functions associated with the monitoring system 170. In yet a further implementation, the processor 110 may be an image processing unit or co-processor of a camera within the vehicle 100.

In one embodiment, the monitoring system 170 includes a memory 210 that stores the detection module 220 and the capture module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etcetera for independently performing one or more of the noted functions.

Furthermore, in one embodiment, the monitoring system 170 includes a data store 240. The data store 240 is, in one embodiment, an electronically-based data structure for storing information. In one approach, the data store 240 is a database that is stored in the memory 210 or another suitable storage medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250, and operating data 260 along with, for example, other information that is used by the modules 220 and 230. For example, in a further arrangement, the data store 240 may store a parameter that controls an image processing unit to process images according to selected type of bounding box.

Accordingly, the detection module 220 generally includes instructions that function to control the processor 110 to acquire data inputs from one or more sensors (e.g., a LiDAR sensor, a camera, a radar, etc.) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, pedestrians, and other objects that may be present proximate to the vehicle 100 within a roadway, within a parking lot, garage structure, driveway, or another area within which the vehicle 100 is operating.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

Whether the sensor data 250 is derived from a single sensor or multiple sensors, the sensor data 250 is comprised of information about a surrounding environment from which the monitoring system 170 can derive determinations about a current context of the vehicle 100 that inform the monitoring system 170 about how to select between three-dimensional bounding boxes and two-dimensional bounding boxes for representing objects. In a further arrangement, the detection module 220 also acquires the operating data 260. The detection module 220, in one approach, queries various components within the vehicle 100 to acquire the operating data 260. For example, the detection module 220 may use a controller area network (CAN) bus to query and acquire information from a sensor system 120, including various sensors in the vehicle 100 that provide information about the external environment (i.e., environment sensors 122) and information about the vehicle 100 itself (i.e., vehicle sensors). Thus, the operating data 260 may include a processor temperature of the processor 110 or a separate image processing unit of a camera, current state information about sensors of the sensor system 120, dynamics data of the vehicle 100 (e.g., current speed), and so on. As an additional aspect, it should be appreciated that the processor temperature is generally associated with whichever device is generating the bounding boxes.

Once the detection module 220 acquires the information that includes the sensor data 250 and the operating data 260, the detection module 220 analyzes the information to determine which type of bounding box to use when processing the sensor data 250. As will be discussed in greater detail with respect to FIG. 4, the detection module 220 applies one or more processing thresholds that form a policy indicating when to switch between the 2D and 3D bounding boxes. As a brief example, the detection module 220 may determine whether the image processing unit satisfies a threshold temperature, whether a radar/LiDAR is experiencing any errors, whether there are solid lane markers or guard rails bounding a lane of the vehicle 100, whether a location of another vehicle is at a defined threshold angle relative to a heading of the vehicle 100, whether the vehicle 100 is approaching an intersection, whether a speed of the vehicle 100 satisfies a defined speed threshold.

According to the analysis of the noted factors, the detection module 220 sets a parameter that controls whether to use 3D or 2D bounding boxes when representing identified objects. It should be appreciated that the process of acquiring the sensor data 250 and the operating data 260 occurs iteratively and may also occur in parallel as the detection module 220 is analyzing the information. In this way, the detection module 220 can account for changing circumstances that may influence the selection.

In any case, once the detection module 220 sets the parameter, the capture module 230 analyzes the sensor data 250 according to the parameter. That is, the capture module 230 analyzes images, point clouds, radar data, and any other included data to identify instances of objects and represent bounds of those objects using the selected type of bounding box. Thus, the capture module 230 may further provide determinations about the identified objects using the selected bounding box to the assistance system 160 and/or other systems in the vehicle 100 that utilize such determinations to perform various tasks. Accordingly, the identified objects are generally represented using the specified type of bounding box in order to facilitate additional functions in the vehicle 100 that may involve controlling the vehicle 100 to avoid the identified objects, generate warnings about the identified objects, and so on.

Figure 3:
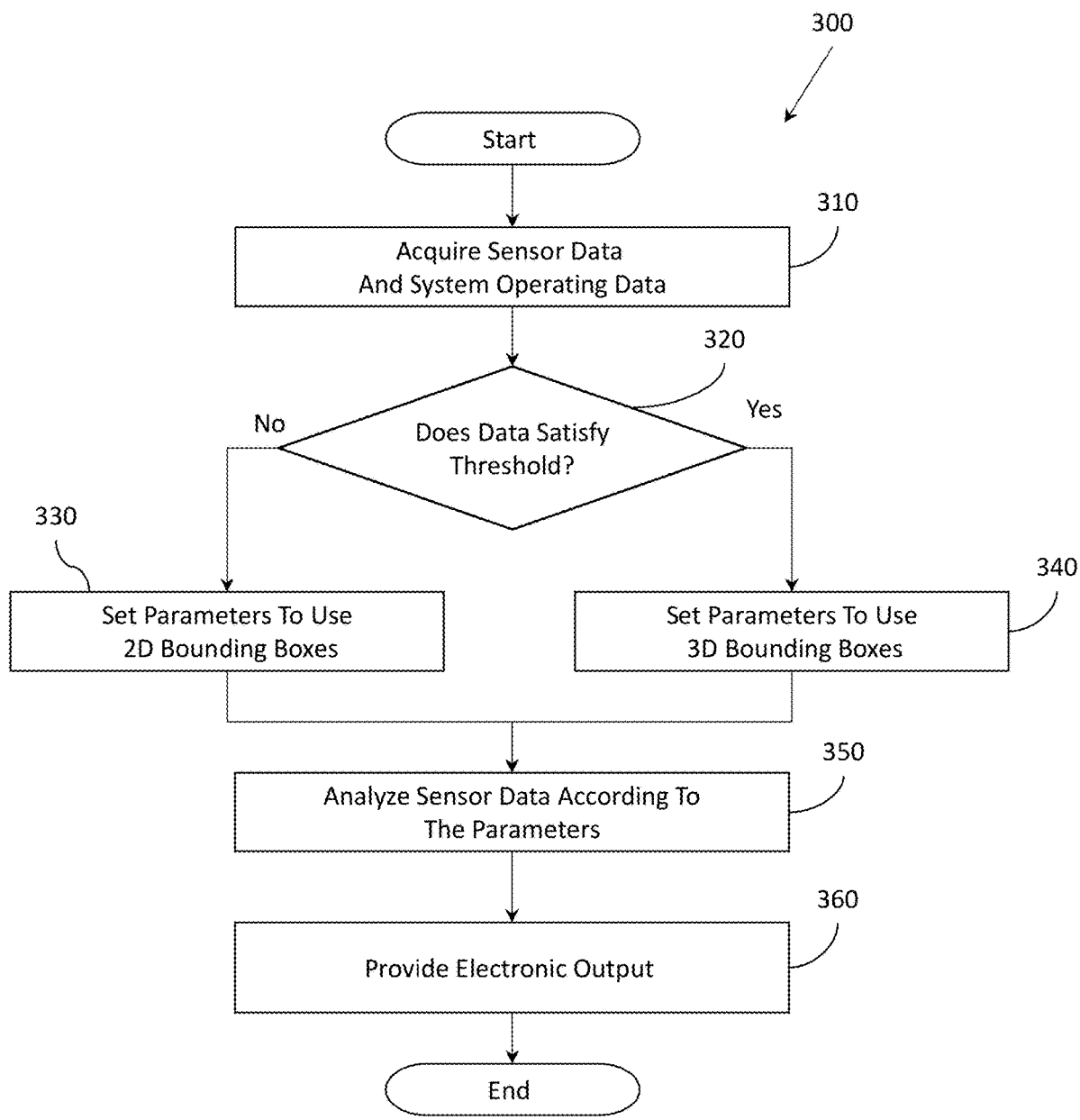
FIG. 3 illustrates one embodiment of a method associated with selecting how a vehicle represents identified objects.

Additional aspects of improving object representation will be discussed in relation to FIG. 3. FIG. 3 illustrates a method 300 associated with selectively adapting how a vehicle represents objects. Method 300 will be discussed from the perspective of the monitoring system 170 of FIG. 1. While method 300 is discussed in combination with the monitoring system 170, it should be appreciated that the method 300 is not limited to being implemented within the monitoring system 170 but is instead one example of a system that may implement the method 300.

At 310, the detection module 220 acquires the information. In at least one arrangement, the information includes the sensor data 250 and the operating data 260. As noted, the sensor data 250 generally includes observations of the surrounding environment from at least one sensor of the subject vehicle 100. In one embodiment, the detection module 220 acquires the sensor data 250 about a surrounding environment of the vehicle 100. The detection module 220, in one or more implementations, iteratively acquires the sensor data 250 from one or more sensors of the sensor system 120 to which the monitoring system 170 is communicatively coupled. The sensor data 250 includes observations of a surrounding environment of the subject vehicle 100, including at least regions ahead and extending laterally outward from the vehicle 100. As noted previously, the detection module 220 acquires the sensor data 250 and may fuse observations from different sensors together in order to provide comprehensive information about the surrounding environment. Moreover, the monitoring system 170 and/or further systems of the vehicle 100 may also acquire and process the sensor data 250 in support of various automated driving functions.

Furthermore, the operating data 260 generally indicates operating conditions of the vehicle 100. That is, the operating data 260 includes various system status indicators, such as error states for sensors, operating temperatures of processing units, and so on. In further implementations, the operating data 260 may further include current processor usage information, and/or other information that is indicative of a computational load.

At 320, the detection module 220 determines whether the information acquired at 310 satisfies a processing threshold. In one or more arrangements, the processing threshold defines one or more conditions that indicate either alone or in combination when to select 2D or 3D bounding boxes. Thus, the processing threshold may define limits on a temperature of an image processing unit over which using a 3D bounding box is not feasible because of current processing loads. The processing threshold may further indicate whether one or more sensors of the vehicle are encountering an error and thus not providing accurate data, which may result in the monitoring system 170 selecting the 3D bounding box in order to provide better determinations with less data. The processing threshold may further indicate the presence of road features, such as guard rails or solid lane markers that indicate the vehicle 100 cannot pass and will likely maintain a current lane. The road features may further include the location of the vehicle 100 relative to an intersection or other complex navigational point along a route.

Furthermore, the processing threshold may further indicate aspect relating to speed of the vehicle 100, such as an upper limit above which more accuracy is preferred. Additional aspects of the processing threshold will be discussed subsequently. However, it should be appreciated that if the information satisfies the processing threshold, then the monitoring system 170 continues to set the parameter at block 340, whereas if the information does not satisfy the threshold, then the monitoring system 170 proceeds to set the parameter at block 330 according to a different type of bounding box.

At 330, the detection module 220 sets the parameter for analyzing the sensor data 250 to use 2D bounding boxes for representing identified objects. In general, the detection module 220 selects the 2D bounding boxes when additional computational resources are not available as indicated by high processing temperatures of an image processing unit (i.e., a processor in a camera) or other indicators. Additionally, the detection module 220 may select the 2D bounding boxes when conserving computational resources/energy and/or when a current context of the vehicle 100 is comparatively simple (i.e., straight highway driving). In any case, the detection module 220 may set the parameter by changing a value of the parameter in a register or another memory location in order to cause the image processing unit to use the 2D bounding boxes.

At 340, the detection module 220 sets the parameter for analyzing the sensor data 250 according to use 2D bounding boxes for representing identified objects in a surrounding environment of the vehicle 100. In general, the detection module 220 selects the 3D bounding boxes when the vehicle 100 is approaching complex areas for navigating, such as intersections, areas with multiple other moving objects, and so on. Moreover, the detection module 220 may use the 3D bounding box when one or more sensors are unavailable to ensure the information that is available is leveraged to the full extent possible. In this way, the monitoring system 170 can adapt to changing circumstances in order to provide improved perceptions from available sensor data.

At 350, the capture module 230 analyzes the sensor data 250 according to the parameter. That is, the capture module 230 may control the processor 110 or another processor, such as an imaging processing unit of an onboard camera of the vehicle 100, to process the sensor data 250 using the selected type of bounding box to track identified objects. In general, the capture module 230 provides for identifying distinct objects within the surrounding environment of the vehicle 100 as represented by the sensor data 250. The capture module 230 further generates the bounding boxes for separate objects. The bounding boxes are generated around an outer boundary of the objects to identify an extent of the object. In the case of a 2D bounding box, the capture module 230 defines the bounding box according to an observed profile. By contrast, the 3D bounding box is generated around an actual 3D spatial extent of the objects in the surrounding environment to provide an improved resolution over the 2D bounding box. The capture module 230 can then track the object using the constructed bounding box between different frames of information in the sensor data 250.

At 360, the capture module 230 provides an electronic output in the vehicle 100 according to the parameter. In at least one arrangement, the capture module 230 provides the output to control the vehicle 100 according to identified objects that are represented by one of the 3D bounding boxes and the 2D bounding boxes as defined by the parameter. That is, the capture module 230 provides the output to, for example, the assistance system 160. The assistance system 160 may then generate alerts according to the outputs, control the vehicle 100, perform path planning, and so on in support of automated functions of the vehicle 100, such as autonomous driving and/or various safety systems (e.g., obstacle avoidance, rear-collision detection, etc.).

Figure 4:
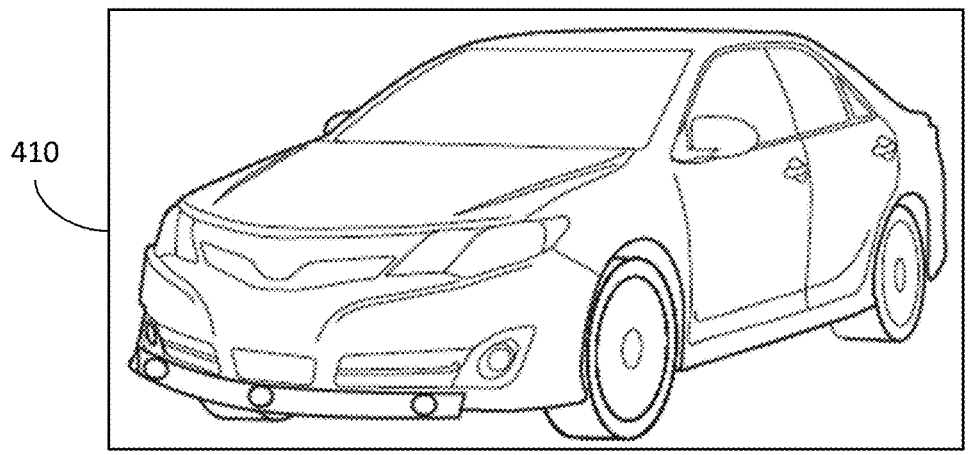
FIG. 4 illustrates one example of 2D versus 3D bounding boxes.
Figure 4:
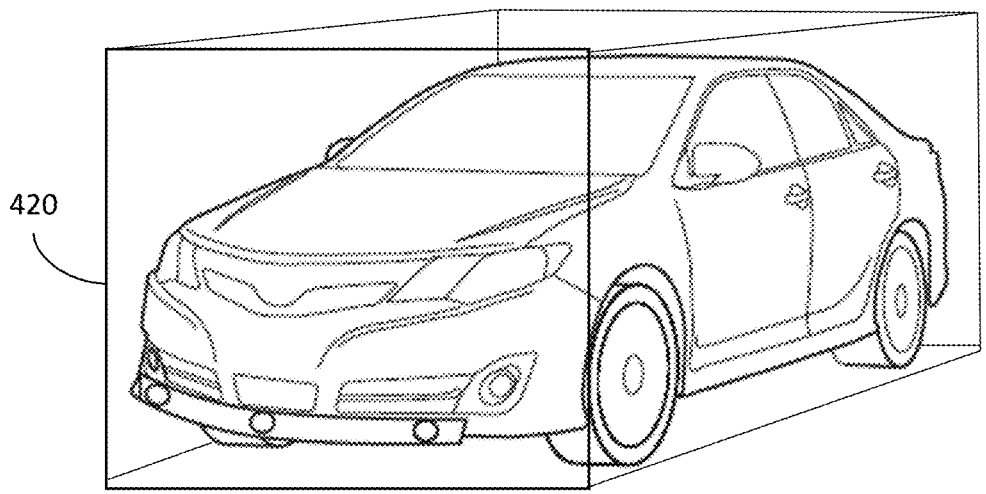

As a brief explanation of the different types of bounding boxes, consider FIG. 4. FIG. 4 illustrates a two-dimensional bounding box 410 and a three-dimensional bounding box 420. The two-dimensional bounding box 410 extends around an occupied space of a representative vehicle from a perspective of an image. It should be noted that the actual forward profile of the representative vehicle is not specifically set forth by the bounding box 410. Instead, the bounding box 410 extends around an entire profile that also includes a side and rear section of the representative vehicle. Thus, the bounding box 410 does not provide an accurate representation of depth. By contrast, the three-dimensional bounding box 420 provides a spatially accurate representation that is aligned with a forward profile. Thus, the three-dimensional bounding box 420 provides a better assessment of a location of different parts of the representative vehicle relative to the vehicle 100. Moreover, the two-dimensional bounding box 410 can be represented using four distinct points for the four separate vertices, while the three-dimensional bounding box 420 requires twice as many points. Thus, the three-dimensional bounding box represents a greater computational load to process.

Figure 5:
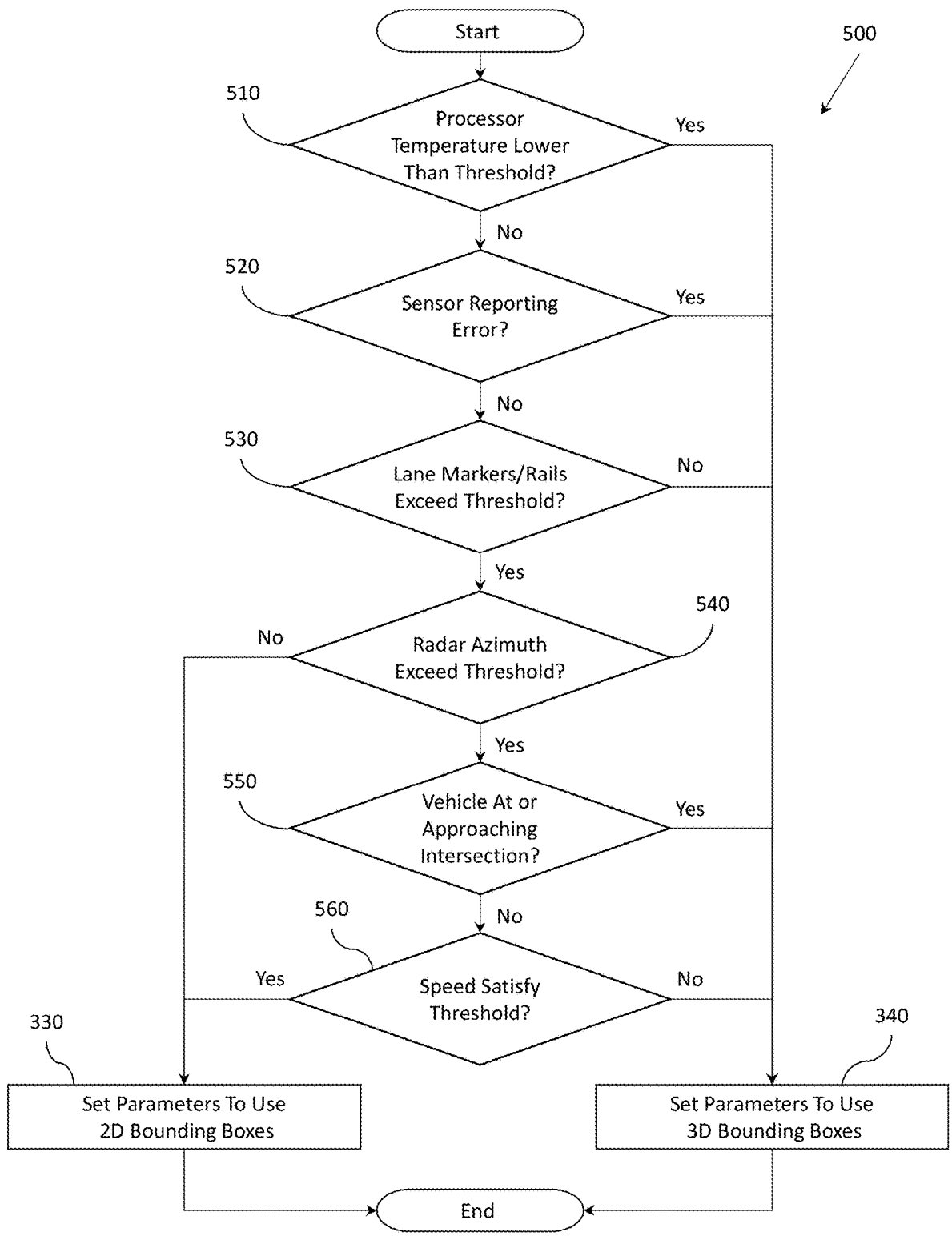
FIG. 5 illustrates one embodiment of a method associated with analyzing information to select between 2D and 3D bounding boxes.

Aspects associated with determining whether the sensor data 250 and the operating data 260 satisfy the processing threshold will be discussed in relation to FIG. 5. FIG. 5 illustrates a method 500 associated with determining whether the processing threshold is satisfied. Method 500 will be discussed from the perspective of the monitoring system 170 of FIG. 1. While method 500 is discussed in combination with the monitoring system 170, it should be appreciated that the method 500 is not limited to being implemented within the monitoring system 170 but is instead one example of a system that may implement the method 500.

At 510, the detection module 220 determines whether a current temperature of the image processing unit (e.g., processor 110) satisfies the processing threshold. In one arrangement, the detection module 220 determines whether the current temperature is below a defined threshold temperature (e.g., 40 degrees C.). If the current temperature is below the defined threshold temperature, then the detection module 220 may set the parameter to use 3D bounding boxes. Otherwise, the detection module 220 may continue to determine further conditions before setting the parameter.

At 520, the detection module 220 determines whether any sensors of the vehicle 100 are reporting errors and, thus, whether an error condition satisfies the processing threshold. In one arrangement, the detection module 220 queries sensors (e.g., environment sensors 122) of the vehicle 100 to determine whether the sensors are operating correctly (i.e., generating accurate perceptions) or are experiencing error conditions (e.g., generating the sensor data 250 with errors). When the detection module 220 determines that errors are present that satisfy the processing threshold, then the detection module 220 sets the parameter to use 3D bounding boxes. Otherwise, the detection module 220 continues the analysis of the information in comparison to the processing threshold.

At 530, the detection module 220 determines whether the sensor data 250 indicates that lane markers/guar rails exceed the processing threshold. The processing threshold may define a length for a section of lane markers and/or guard rails. In general, the lane markers are double-line lane markers and indicate that the vehicle 100 cannot pass another vehicle on the roadway. Similarly, the guard rails are also indicative of locations where the vehicle 100 cannot pass. Thus, the processing threshold defines a length (e.g., 40 m or more) of these features either alone or in combination that broadly indicates that the vehicle 100 cannot pass. As such, if the detection module 220 determines that the features are not present, then the detection module 220 sets the parameter to use 3D bounding boxes. Otherwise, the analysis continues.

At 540, the detection module 220 determines whether an azimuth (e.g., angle) of the radar exceeds the processing threshold. In one arrangement, the detection module 220 may determine the azimuth in relation to dynamic objects in the surrounding environment. When the angle is not greater than an angle defined by the processing threshold (e.g., +/−3 degrees) relative to a heading of the vehicle 100, then the detection module 220 determines that the angle doesn't satisfy the processing threshold and sets the parameter to use 2D bounding boxes. When the angle of the processing threshold is satisfied, then this may indicate a need for further accuracy with 3D bounding boxes since the object is not well perceived by the radar, and the analysis continues.

At 550, the detection module 220 determines whether the vehicle 100 is at or approaching an intersection. In one arrangement, the detection module 220 compares a current position against a map and determines a current roadway context that indicates whether the vehicle 100 is in such a location. In various embodiments, the particular location may include intersections and may also include other types of complex roadway locations, such as on/off ramps, areas of high traffic, and so on. In any case, when the vehicle 100 is located at such a location, then the detection module 220 sets the parameter to use a 3D bounding box. Otherwise, the analysis of the processing threshold continues.

At 560, the detection module 220 determines whether a speed of the vehicle 100 satisfies the processing threshold. In one arrangement, the detection module 220 determines whether the vehicle 100 is traveling less than a defined speed (e.g., 5 m/s). If the vehicle 100 is traveling less than the defined speed, then the detection module 220 sets the parameter to use 2D bounding boxes. Otherwise, the detection module 220 sets the parameter to use 3D bounding boxes. In this way, the monitoring system 170 can selectively switch between 2D and 3D bounding boxes to improve the perception of dynamic objects while balancing computational efficiency.

Figure 6:
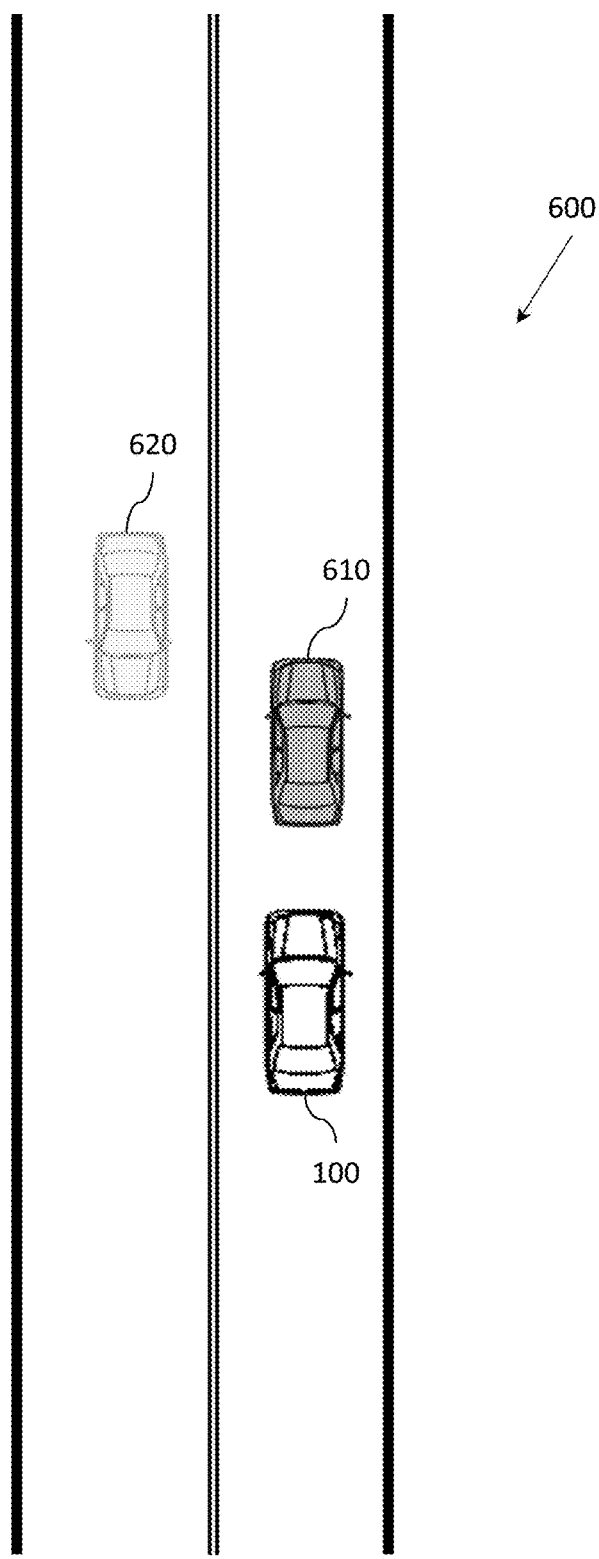
FIG. 6 illustrates an example scenario of a subject vehicle following another vehicle along a roadway.
Figure 7:
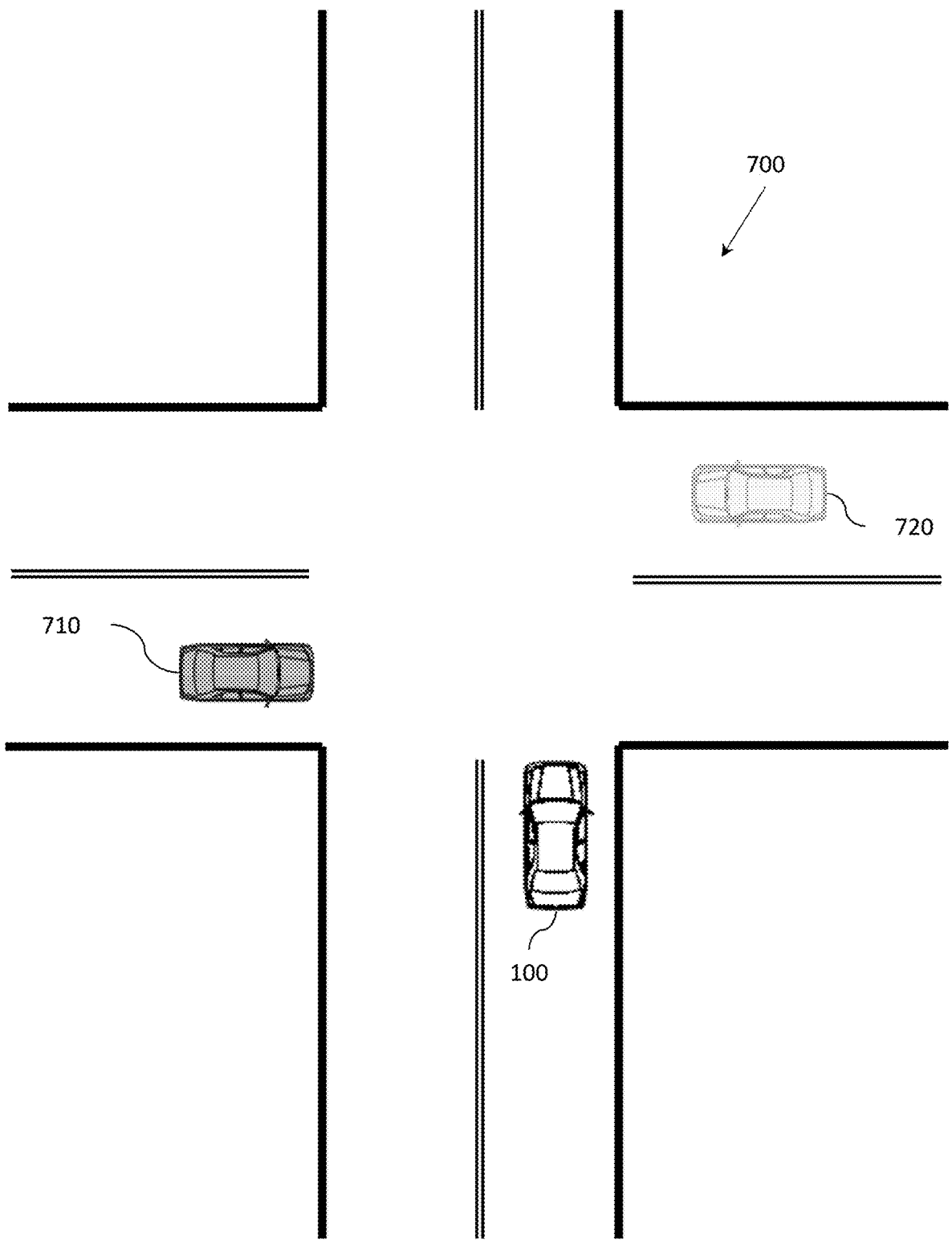
FIG. 7 illustrates an example scenario of a vehicle at an intersection.

As a further explanation of how the presently disclosed systems and methods function, consider FIGS. 6-7. FIG. 6 illustrates a two-lane road 600 on which the vehicle 100 is traveling behind a vehicle 610 with an oncoming vehicle 620 approaching. The vehicle 100 is bounded by a solid double line to the left, which means that the vehicle 100 cannot pass. Moreover, where the monitoring system 170 identifies the condition of the lane lines and further determines all sub-systems (e.g., sensors, processor temp., etc.) are operating normally and/or within defined bounds, then the monitoring system 170 sets the parameter to use 2D bounding boxes since the current condition does not require greater accuracy from 3D bounding boxes.

By contrast, FIG. 7 illustrates an intersection 700. As shown, the vehicle 100 is located at the intersection 700 with two separate vehicles 710 and 720. Vehicle 720 is within the defined azimuth for the radar; however, the vehicle 710 exceeds the defined azimuth. As such, the monitoring system 170 determines that the vehicle 100 is to use 3D bounding boxes to account for the extreme angle and better track the vehicle 710.

Additionally, it should be appreciated that the monitoring system 170 from FIG. 1 can be configured in various arrangements with separate integrated circuits and/or electronic chips. In such embodiments, the detection module 220 is embodied as a separate integrated circuit. Additionally, the capture module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the monitoring system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1; however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the monitoring system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the monitoring system 170, and/or the assistance system 160 may control some or all of these vehicle systems 150 and, thus, may be partially or fully autonomous.

The processor(s) 110, the monitoring system 170, and/or the assistance system 160 can be operatively connected to communicate with the various vehicle systems 150 and/or individual components thereof. For example, returning to FIG. 1, the processor(s) 110, the monitoring system 170, and/or the assistance system 160 can be in communication to send and/or receive information from the various vehicle systems 150 to control the movement, speed, maneuvering, heading, direction, etc. of the vehicle 100. The processor(s) 110, the monitoring system 170, and/or the assistance system 160 may control some or all of these vehicle systems 150.

The processor(s) 110, the monitoring system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the monitoring system 170, and/or the assistance system 160 can control the direction and/or speed of the vehicle 100. The processor(s) 110, the monitoring system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the monitoring system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include an assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the monitoring system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from the sensor data 250 as implemented by the module 230. "Driv-ing maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A monitoring system, comprising:
one or more processors;
a memory communicably coupled to the one or more processors and storing:
a detection module including instructions that, when executed by the one or more processors, cause the one or more processors to, in response to acquiring information including sensor data and operating data in a vehicle, set a parameter for analyzing the sensor data according to the information by selecting between 3D bounding boxes and 2D bounding boxes for representing identified objects in a surrounding environment of the vehicle, wherein selecting includes determining available processing resources of the vehicle and a complexity of a roadway context of the vehicle according to the sensor data and the operating data that define the roadway context; and a capture module including instructions that, when executed by the one or more processors, cause the one or more processors to i) analyze the sensor data according to the parameter, and ii) provide an electronic output in the vehicle according to the parameter.

2. The monitoring system of claim 1, wherein the detection module includes instructions to set the parameter including instructions to determine whether the information satisfies a processing threshold associated with available processing resources of the vehicle and a complexity of a roadway context of the vehicle.

3. The monitoring system of claim 2, wherein the processing threshold defines elements of the processing threshold selected from a group including: limits on a temperature of an image processing unit, whether sensors of the vehicle are encountering an error, and attributes of the surrounding environment of the vehicle.

4. The monitoring system of claim 1, wherein the detection module includes instructions to set the parameters to control an image processing unit in the vehicle to process at least images from the sensor data according to a selected one of the 3D bounding boxes and the 2D bounding boxes.

5. The monitoring system of claim 1, wherein the sensor data includes at least observations of a surrounding environment of the vehicle, and the operating data indicates operating conditions of the vehicle.

6. The monitoring system of claim 1, wherein the capture module includes instructions to analyze the sensor data including instructions to track identified objects according to a type of bounding box defined by the parameter, and
    wherein the capture module includes instructions to track the identified objects using 3D bounding boxes to provide improved resolution over tracking the identified objects using 2D bounding boxes.

7. The monitoring system of claim 1, wherein the capture module includes instructions to provide the electronic output including instructions to control the vehicle according to identified objects that are represented by one of the 3D bounding boxes and the 2D bounding boxes as defined by the parameter.

8. A non-transitory computer-readable medium storing instructions that, when executed by one or more processors, cause the one or more processors to:
    in response to acquiring information including sensor data and operating data in a vehicle, set a parameter for analyzing the sensor data according to the information by selecting between 3D bounding boxes and 2D bounding boxes for representing identified objects in a surrounding environment of the vehicle, wherein selecting includes determining available processing resources of the vehicle and a complexity of a roadway context of the vehicle according to the sensor data and the operating data that define the roadway context;
    analyze the sensor data according to the parameter; and
    provide an electronic output in the vehicle according to the parameter.

9. The non-transitory computer-readable medium of claim 8, wherein the instructions to set the parameter include instructions to determine whether the information satisfies a processing threshold associated with available processing resources of the vehicle and a complexity of a roadway context of the vehicle.

10. The non-transitory computer-readable medium of claim 9, wherein the processing threshold defines one or more of limits on a temperature of an image processing unit, whether sensors of the vehicle are encountering an error, and attributes of the surrounding environment of the vehicle.

11. The non-transitory computer-readable medium of claim 8, wherein the instructions to set the parameters include instructions to control an image processing unit in the vehicle to process at least images from the sensor data according to a selected one of the 3D bounding boxes and the 2D bounding boxes.

12. The non-transitory computer-readable medium of claim 8, wherein the sensor data includes at least observations of a surrounding environment of the vehicle, and the operating data indicates operating conditions of the vehicle.

13. The non-transitory computer-readable medium of claim 8, wherein the instructions to analyze the sensor data include instructions to track identified objects according to a type of bounding box defined by the parameter, and
    wherein the instructions to track the identified objects using 3D bounding boxes to provide improved resolution over tracking the identified objects using 2D bounding boxes.

14. A method, comprising:
    in response to acquiring information including sensor data and operating data in a vehicle, setting a parameter for analyzing the sensor data according to the information by selecting between 3D bounding boxes and 2D bounding boxes for representing identified objects in a surrounding environment of the vehicle, wherein selecting includes determining available processing resources of the vehicle and a complexity of a roadway context of the vehicle according to the sensor data and the operating data that define the roadway context;
    analyzing the sensor data according to the parameter; and
    providing an electronic output in the vehicle according to the parameter.

15. The method of claim 14, wherein setting the parameter includes determining whether the information satisfies a processing threshold associated with available processing resources of the vehicle and a complexity of a roadway context of the vehicle.

16. The method of claim 15, wherein the processing threshold defines one or more of limits on a temperature of an image processing unit, whether sensors of the vehicle are encountering an error, and attributes of the surrounding environment of the vehicle.

17. The method of claim 14, wherein setting the parameters controls an image processing unit in the vehicle to process at least images from the sensor data according to a selected one of the 3D bounding boxes and the 2D bounding boxes.

18. The method of claim 14, wherein the sensor data includes at least observations of a surrounding environment of the vehicle, and the operating data indicates operating conditions of the vehicle.

19. The method of claim 14, wherein analyzing the sensor data includes tracking identified objects according to a type of bounding box defined by the parameter, and
    wherein tracking the identified objects using 3D bounding boxes provides improved resolution over tracking the identified objects using 2D bounding boxes.

20. The method of claim 14, wherein providing the electronic output includes controlling the vehicle according to identified objects that are represented by one of the 3D bounding boxes and the 2D bounding boxes as defined by the parameter.

* * * * *

UNITED STATES PATENT AND TRADEMARK OFFICE
CERTIFICATE OF CORRECTION

PATENT NO. : 11,393,184 B2
APPLICATION NO. : 17/097643
DATED : July 19, 2022
INVENTOR(S) : Yu Yan It is certified that error appears in the above-identified patent and that said Letters Patent is hereby corrected as shown below:

In the Specification

Column 9, Line 66 replace "lane markers/guar rails" with -- lane markers/guard rails --.

In the Claims

Claim 4, replace "set the parameters to" with -- set the parameter to --.

Claim 6, replace "using 3D bounding boxes" with -- using the 3D bounding boxes --.

Claim 6, replace "using 2D bounding boxes" with -- using the 2D bounding boxes --.

Claim 11, replace "instructions to set the parameters" with -- instructions to set the parameter --.

Claim 13, replace "using 3D bounding boxes" with -- using the 3D bounding boxes --.

Claim 13, replace "using 2D bounding boxes" with -- using the 2D bounding boxes --.

Claim 19, replace "using 3D bounding boxes" with -- using the 3D bounding boxes --.

Claim 19, replace "using 2D bounding boxes" with -- using the 2D bounding boxes --.

Signed and Sealed this
Sixth Day of December, 2022

Katherine Kelly Vidal
*Director of the United States Patent and Trademark Office*